US011973562B2

United States Patent
Rusek (10) Patent No.: US 11,973,562 B2
(45) Date of Patent: Apr. 30, 2024

(54) INTERNAL DATA TRANSFER IN A MULTIPLE-ANTENNA COMMUNICATION SYSTEM

(71) Applicant: Sony Group Corporation, Tokyo (JP)

(72) Inventor: Fredrik Rusek, Eslov (SE)

(73) Assignee: Sony Group Corporation, Tokyo (JP)

( * ) Notice: Subject to any disclaimer, the term of this patent is extended or adjusted under 35 U.S.C. 154(b) by 107 days.

(21) Appl. No.: 17/790,736

(22) PCT Filed: Jan. 11, 2021

(86) PCT No.: PCT/EP2021/050365
§ 371 (c)(1),
(2) Date: Jul. 3, 2022

(87) PCT Pub. No.: WO2021/144217
PCT Pub. Date: Jul. 22, 2021

(65) Prior Publication Data
US 2023/0046663 A1    Feb. 16, 2023

(30) Foreign Application Priority Data

Jan. 14, 2020 (SE) .................................. 2050018-7

(51) Int. Cl.
*H04B 7/08* (2006.01)
*H04B 7/0413* (2017.01)
(52) U.S. Cl.
CPC .......... *H04B 7/0848* (2013.01); *H04B 7/086* (2013.01); *H04B 7/0413* (2013.01)
(58) Field of Classification Search
CPC .... H04B 7/0837; H04B 7/0848; H04B 7/086; H04B 7/0413; H04B 7/0452; H04B 7/0842; H04L 27/2647
See application file for complete search history.

(56) References Cited

U.S. PATENT DOCUMENTS 7,218,693 B2    5/2007 Troulis
7,895,254 B2    2/2011 Ketchum
(Continued)

FOREIGN PATENT DOCUMENTS

EP    2104981 A2    9/2009

OTHER PUBLICATIONS

International Search Report and Written Opinion from corresponding International Application No. PCT/EP/2021/050365, dated Mar. 19, 2021, 10 pages.
(Continued)

*Primary Examiner* — Sophia Vlahos
(74) *Attorney, Agent, or Firm* — Tucker Ellis LLP (57) ABSTRACT

A preprocessing arrangement is configured for installation in a multiple-antenna communication system, e.g. a MI-MO-enabled device, to improve internal data transfer of the system. The arrangement is interposed between an antenna array and a computer device. In operation, the arrangement obtains (301) a diagonal matrix W of multiplicator values, the diagonal matrix W being given by H=WAX, wherein H is a channel transmission matrix for the system, A is a predefined filter matrix, and X is a matrix that depends on H. The arrangement further extracts (302) an input vector Y of signal values from the antenna array, generates (303) an output vector $\hat{Y}$ of output values by forming $A^H W^H Y$, wherein superscript indicates Hermitian transpose, and provides the output values in the output vector $\hat{Y}$ to the computer device. By providing the output vector $\hat{Y}$, the number of signal values to be received and jointly processed by the computer device is reduced relative to the number of antennas in the antenna array.

20 Claims, 5 Drawing Sheets

(56) References Cited

U.S. PATENT DOCUMENTS

| | | | |
|---|---|---|---|
| 8,416,841 B1 | 4/2013 | Tarn | |
| 2005/0249304 A1* | 11/2005 | Takano | H04B 7/0613 |
| | | | 375/267 |
| 2006/0002496 A1 | 1/2006 | Wallace | |
| 2006/0008022 A1 | 1/2006 | Wight | |
| 2007/0268981 A1 | 11/2007 | Heiskala | |
| 2008/0084944 A1 | 4/2008 | Park | |
| 2008/0130765 A1 | 6/2008 | Wight | |
| 2008/0232505 A1 | 9/2008 | Al-Dhahir | |

OTHER PUBLICATIONS

Office Action and Search Report from corresponding Swedish Application No. 2050018-7, dated Nov. 6, 2020, 8 pages.

Kaipeng Li et al., Decentralized Coordinate-Descent Data Detection and Precoding for Massive MU-MIMO, 2019 IEEE International Symposium on Circuits and Systems (ISCAS), May 26, 2019, 5 pages.

Jesus Rodroguez Sanchez et al., "Fully Decentralized Massive MIMO Detection Based on Recursive Methods," Aug. 28, 2018, 6 pages.

Jia Liu et al., A Novel Nonlinear Joint Transmitted-Receiver Processing Algorithm for the Downlink of Multiuser MIMO Systems, IEEE Transactions on Vehicular Technology, vol. 57, No. 4, Jul. 2008, 16 pages.

Juan Vidal Alegria et al., "Trade-offs in Decentralized Multi-Antenna Architectures: The WAX Decomposition," Dec. 1, 2020; 13 pages.

\* cited by examiner

INTERNAL DATA TRANSFER IN A MULTIPLE-ANTENNA COMMUNICATION SYSTEM

TECHNICAL FIELD

The present disclosure relates generally to multiple-antenna communication systems for serving more than one user, and in particular to a preprocessing arrangement and method for such systems.

BACKGROUND ART

Regarded as a breakthrough in wireless communication system design, multiple antenna systems fuel the ever increasing data rate requirements of advanced technologies like UMTS, LTE, WLAN etc. Multiple-antenna communication systems come in different flavors and are generally referred as Multiple Input Multiple Output systems (MIMO). To increase data rate, massive MIMO (also known as Large-Scale Antenna Systems or Very Large MIMO) is a promising technology, for example for use in next generation mobile networks. Massive MIMO systems are contemplated to include base stations having antenna arrays with a large number of antennas and being capable of serving more than one terminal (user equipment, UE) in the same time-frequency response. Such massive MIMO systems are sometimes referred to as multiuser (MU) MIMO.

In one conceivable implementation of MU MIMO, all incoming data samples at an antenna array are transferred to one or more central processors for processing, such as demodulation, channel estimation, data detection, etc. However, such centralized processing results in high interconnection rate between the antenna array and the central processor. In a non-limiting example of M antennas, an operating bandwidth of B Hz and an OFDM system, the rate of incoming complex-valued samples to a central processor is M·B samples per second. If the quantization is q bits per sample, the total incoming bit rate to the central processor is M·B·q bits per second. In an example base station having M=100, B=100 MHz and q=16, the incoming bit rate would be 160 Gbit/s, which is costly to accommodate and may even exceed the capabilities of existing interconnect standards. Further, a single central processor may not have the I/O bandwidth, computing and storage resources to realize real-time processing at such high rates. Although both M and B may be considerably smaller in a terminal, the interconnection rate between antenna array and central processor(s) may still be excessive.

SUMMARY

It is an objective to at least partly overcome one or more limitations of the prior art.

A further objective is to reduce the interconnection rate between the antenna array and one or more computer devices in a multiple-antenna communication system.

Another objective is to reduce the interconnection rate at a low hardware complexity, for example at a low hardware complexity of the antennas.

A further objective is to achieve a good tradeoff between interconnection rate and hardware complexity, viz. a decrease of interconnection rate at a modest increase of hardware complexity.

One or more of these objectives, as well as further objectives that may appear from the description below, are at least partly achieved by a preprocessing arrangement, a receiver system, and a method in accordance with the independent claims, embodiments thereof being defined by the dependent claims.

A first aspect is a preprocessing arrangement for a multiple-antenna communication system. The preprocessing arrangement comprises a first plurality of inputs for antenna signals from an antenna array and a second plurality of outputs for connection to at least one computer device, where the second plurality is less than the first plurality. The preprocessing arrangement is configured to: obtain a diagonal matrix, W, of multiplicator values, where the diagonal matrix W is given by a relation $H=WAX$, and H is a channel transmission matrix for the multiple-antenna communication system, A is a predefined filter matrix, and X is a matrix that depends on the channel transmission matrix H. The preprocessing arrangement is further configured to: extract an input vector Y of signal values in the antenna signals from the antenna array; generate an output vector $\hat{Y}$ of output values by forming $A^H W^H Y$, wherein $A^H$ is a Hermitian transpose matrix of the predefined filter matrix A and $W^H$ is a Hermitian transpose of the diagonal matrix W; and provide the output values in the output vector $\hat{Y}$ on a respective output among the second plurality of outputs.

A second aspect is a receiver system comprising the preprocessing arrangement of the first aspect and at least one computer device coupled to receive the output values on the second plurality of outputs of the preprocessing arrangement.

A third aspect is a method of preprocessing in a multiple-antenna communication system. The method comprises: obtaining a diagonal matrix, W, of multiplicator values, where the diagonal matrix W is given by a relation $H=WAX$, and H is a channel transmission matrix for the multiple-antenna communication system, A is a predefined filter matrix, and X is a matrix that depends on the channel transmission matrix H. The method further comprises: extracting an input vector Y of a first plurality of signal values in antenna signals from an antenna array in the multiple-antenna communication system; generating an output vector $\hat{Y}$ of a second plurality of output values by forming $A^H W^H Y$, wherein $A^H$ is a Hermitian transpose matrix of the predefined matrix A and $W^H$ is a Hermitian transpose of the diagonal matrix W, and wherein the second plurality is less than the first plurality; and providing the output values in the output vector $\hat{Y}$ to at least one computer device in the multiple-antenna communication system.

These aspects implement a novel matrix decomposition to reduce a first plurality of signal values in antenna signals from an antenna array into a second plurality of output values. By supplying the second plurality of output values instead of the first plurality of signal values for processing by one or more computer devices, the interconnection rate is reduced between the antenna array and the computer device(s). Further, the number of required ports on the computer device(s) is reduced. The novel matric decomposition may be adapted to enable the preprocessing arrangement to be of low hardware complexity.

Still other objectives, aspects and technical advantages, as well as features and embodiments, may appear from the following detailed description, from the attached claims as well as from the drawings.

BRIEF DESCRIPTION OF THE DRAWINGS

Embodiments will now be described in more detail with reference to the accompanying drawings.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

As used herein, the terms "multiple", "plural" and "plurality" are intended to imply provision of two or more elements, whereas the term a "set" of elements is intended to imply a provision of one or more elements. The term "and/or" includes any and all combinations of one or more of the associated listed elements.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numerals refer to like elements throughout. Further, matrices and vectors are represented by bold characters.

Embodiments relate to a technique of reducing the internal data transfer rate in a multiple-antenna communication system, specifically from an antenna array to one or more computer devices. The following description will focus on uplink signal processing but is equally applicable to downlink signal processing.

Figure 1A:
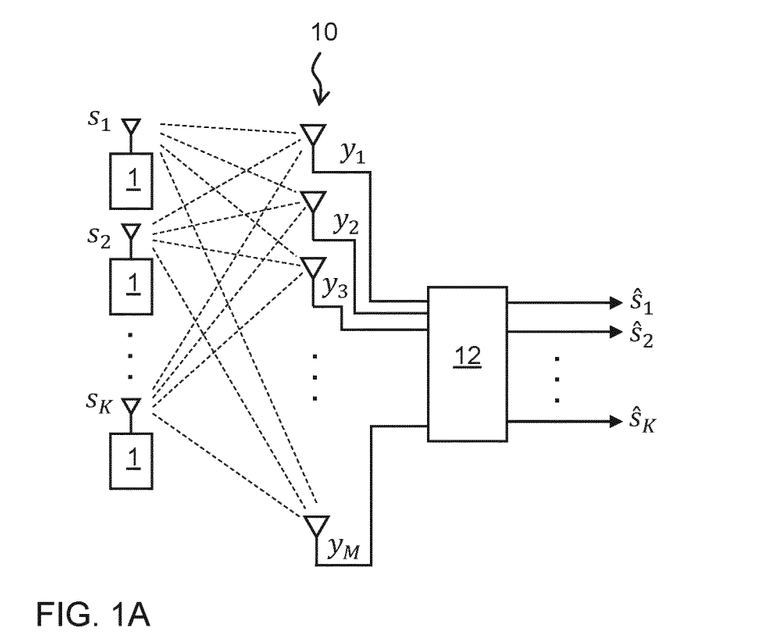
FIGS. 1A-1B are schematic diagrams of multiple-antenna communication systems.

FIG. 1A is a schematic diagram of an exemplary MIMO system as described in the Background section. The MIMO system is configured to receive signals ("transmit signals") $s_1, \ldots, s_K$ transmitted concurrently by a set of communication devices 1, with K being the number of communication devices. The MIMO system comprises an antenna array 10 with a plurality of antennas or antenna elements. The signal received by the respective antenna is designated $y_1, \ldots, y_M$ ("receive signals"), with M being the number of antennas. As indicated by dashed lines, a plurality of RF channels are formed between the antennas of the communication devices 1 and the antennas of the array 10. The outputs of the antennas in the array 10 are connected by an interconnect structure, represented by connecting lines in FIG. 1A, to a computer device 12. The computer device 12 is configured to obtain the receive signals $y_1, \ldots, y_M$ for processing into estimated transmit signals ("reconstruct signals") $\hat{s}_1, \ldots, \hat{s}_K$, which thus represent the transmit signals $s_1, \ldots, s_K$. The plurality of RF channels may be characterized mathematically by a transfer coefficient matrix H. The transfer coefficient matrix H is also commonly referred to as a channel estimate matrix or channel transmission matrix ("channel matrix"). As is well-known in the art, each of the plurality of concurrently received signals $y_1, \ldots, y_M$ may be computed based on the plurality of transmitted signals $s_1, \ldots, s_K$, the channel matrix H, and a noise vector N. The noise vector N may comprise a vector representation of noise that may exist in the communications medium. The relationship between the plurality of receive signals, the plurality of transmit signals, the channel matrix, and the noise vector may be as represented as: Y=HS+N, with receive vector $Y=[y_1 \ldots y_M]^T$, transmit vector $s=[s_1 \ldots s_K]^T$, noise vector $N=[n_1 \ldots n_M]^T$, and channel matrix $$H = \begin{bmatrix} h_{11} & \ldots & h_{1K} \\ \vdots & \ddots & \vdots \\ h_{M1} & \ldots & h_{MK} \end{bmatrix}$$

where the matrix elements $h_{ji}$, contained in the channel matrix H may be computed by the computer device 12 based on at least a portion of data received over the communications medium during a pilot phase, as is well-known in the art. Having obtained the channel matrix H, the computer device 12 may for example compute the reconstructed signals as a reconstruct vector: $\hat{S}=H^{-1}Y$, with $H^{-1}$ being the inverse of the channel matrix H, which may be computed or estimated by the computer device 12 in accordance with any known technique, for example in the form of a pseudoinverse H⁺. The computer device 12, or another computer device, may then further process the reconstruct vector Ŝ, for example by demodulation, data detection, etc.

As discussed in the Background section, the number M of antennas may be large, leading to an excessive data transfer rate between the antenna array 10 and the computer device 12 which is demanding in terms of data transfer capacity of the interconnect structure and resources of the computer device 12. It is also realized that it may be mechanically challenging to interconnect a large number of antennas with the computer device 12, which may be a small integrated circuit. The provision of a large number of inputs on the computer device 12 may also lead to a local concentration of energy that may negatively impact the operation and durability of the computer device 12.

Figure 1B:
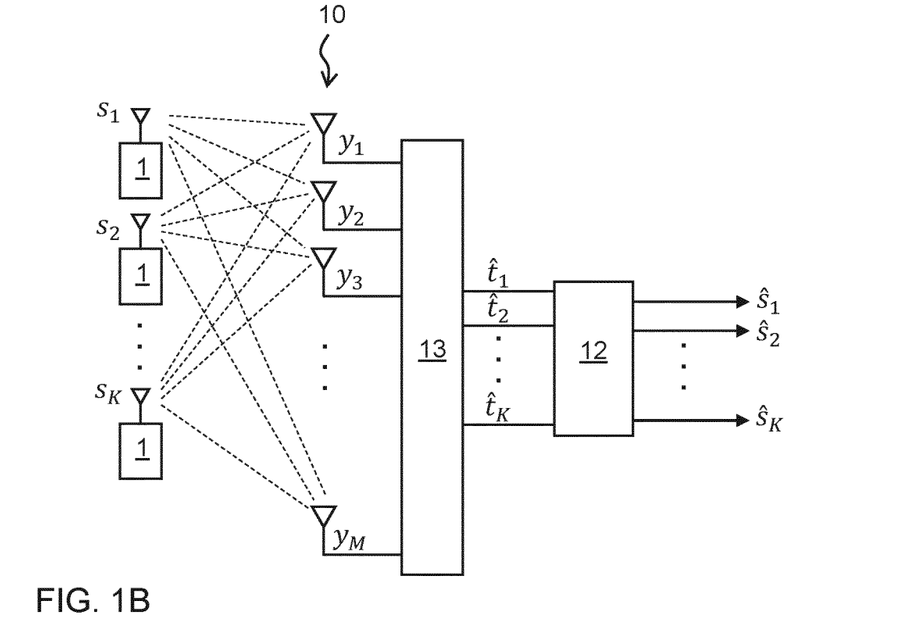

FIG. 1B is a schematic diagram of an alternative MIMO system, which is proposed in the article "Decentralized coordinate-descent data detection and precoding for massive MU-MIMO" by Li et al, 2019 IEEE International Symposium on Circuits and Systems (ISCAS), 2019. Here, a preprocessing block 13 is introduced between the antenna array 10 and the computer device 12. The antenna array is divided into antenna clusters, and the preprocessing block 13 is configured to separately process the data from each cluster by linear minimum mean-square error (L-MMSE) equalization using a coordinate descent (CD) based data detection algorithm, producing a local estimate vector of length K for each cluster. The preprocessing block 13 then fuses the local estimate vectors of the clusters to produce intermediate signals $\hat{t}_1, \ldots, \hat{t}_K$, which are fed to the computer device 12 for further processing into the reconstructed signals $\hat{s}_1, \ldots, \hat{s}_K$. While this alternative reduces the required number of inputs at the computer device 12, and thereby mitigates the above-mentioned drawbacks of the MIMO system in FIG. 1A, it also significantly increases the complexity and computational load upstream of the computer device 12. At least part of the preprocessing block 13 may be integrated in the antenna array 10, which will significantly increase the complexity and cost of the antennas. As future generation massive MIMO systems are likely to have many antennas, it is desirable to maintain a low cost of the individual antennas, which may make the alternative in FIG. 1B less attractive for use in such systems.

Figure 2:
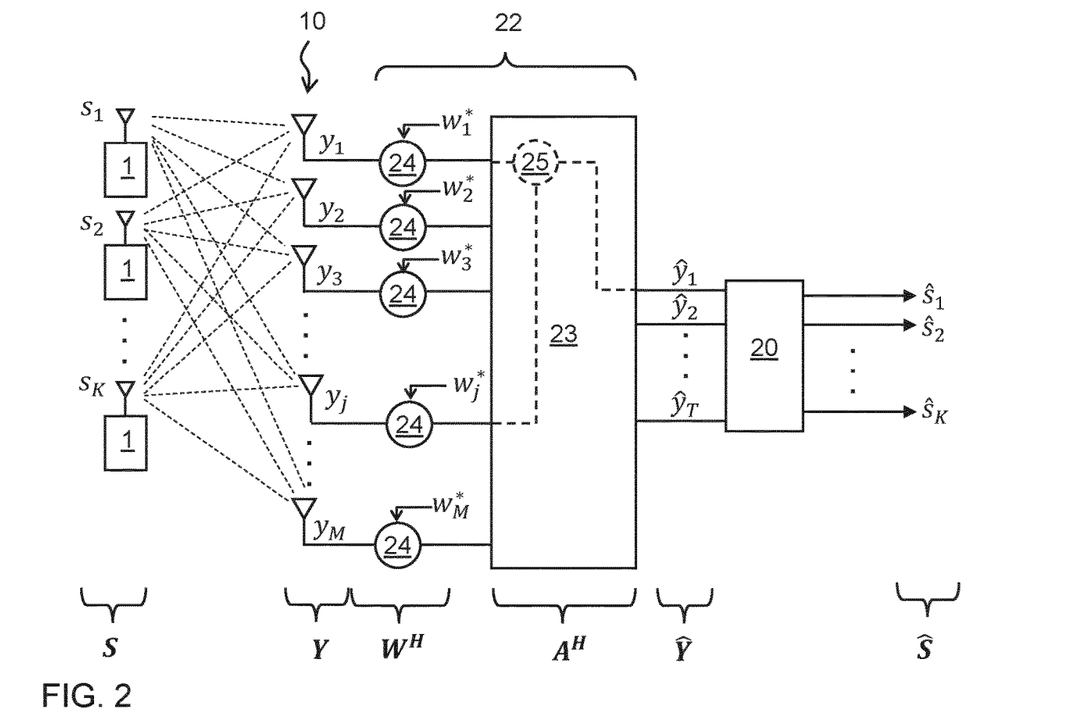
FIG. 2 is a schematic diagram of a multiple-antenna communication system in accordance with an embodiment.

FIG. 2 is a schematic diagram of a MIMO system in accordance with an embodiment. Like in FIGS. 1A-1B, the MIMO system is configured to receive transmit signals $s_1, \ldots, s_K$ transmitted concurrently by a set of K communication devices 1. The communication devices 1 may be single-antenna devices, as shown, or may comprise more than one antenna each. In the following examples, it is assumed that each device 1 has one antenna. The antenna array 10 of the MIMO system is configured to receive the transmit signals and generate corresponding receive signals $y_1, \ldots, y_M$, one for each antenna in the array 10. Like in FIG. 1A, the MIMO system comprises a computer device 20, which is configured to compute the reconstructed signals $\hat{s}_1, \ldots, \hat{s}_K$ that represent the transmit signals $s_1, \ldots, s_K$. The computer device 20 may be realized by a combination of software and hardware circuitry, or exclusively by specific hardware circuitry. In one embodiment, the computer device 20 comprises a processing device or processor, which may be or include a central processing unit (CPU), graphics processing unit (GPU), microcontroller, microprocessor, ASIC, FPGA, or any other specific or general processing device. The processor may execute instructions stored in a memory in or connected to the computer device 20. The memory may comprise one or more of a buffer, a flash memory, a hard drive, a removable media, a volatile memory, a non-volatile memory, a random access memory (RAM), or another suitable data storage device. The instructions when executed by the processor may control the operation of the computer device 20. The instructions may be supplied to the computer device 20 on a computer-readable medium, which may be a tangible (non-transitory) product (for example magnetic medium, optical disk, read-only memory, flash memory, etc.) or a propagating signal.

The MIMO system in FIG. 2 further comprises a preprocessing arrangement 22, which is configured to preprocess the receive signals $y_1, \ldots, y_M$ to reduce the number of signals fed to the computer device 20. In the illustrated example, the receive signals $y_1, \ldots, y_M$ are converted into the intermediate $\hat{y}_1, \ldots, \hat{y}_T$, with T<M. It is understood that both the interconnection rate and the number of required ports on the computer device 20 are reduced, thereby mitigating problems described above. Although not shown in FIG. 2, the MIMO system may comprise more than one computer device 20 and be arranged so that processing is distributed among plural computer devices 20. As will be described in the following, the preprocessing arrangement 22 is configured to define a matched filter that enables the computer device 20 to compute the reconstruct signals $\hat{s}_1, \ldots, \hat{s}_K$ with the same accuracy as the computer device 12 in FIG. 1A, i.e. lossless. Further, the preprocessing arrangement 22 may be specifically configured to be of low complexity and thus enables full or partial integration with the antenna array 10 without significant increase in the cost of the individual antenna. In some embodiments, the preprocessing arrangement 22 and the computer device 20 may be included in a receiver system or "receiver chain" of the MIMO system.

The configuration of the preprocessing arrangement 22 is based on a novel matrix decomposition, which is denoted "WAX factorization" herein. The underlying assumption is that, for any M×K complex-valued matrix H, except for a set of measure 0, and T>M·(K−1)/K, there exists an M×T deterministic matrix A such that H admits the factorization H=WAX, where W is an M×M diagonal matrix that depends on H, and X is a T×K matrix that depends on H. The fact that A is deterministic implies that it is not dependent on H. The validity of the WAX factorization is given by the following. The factorization may be re-written as $W^{-1}H=AX$ whenever W is invertible. With $\tilde{X}=W_{-1}$, this is equivalent to $\tilde{X}H-AX=0$. This relation defines a linear equation system with M+T·K variables and M·K constraints. Thus, the M+T·K variables (constituted by $\tilde{X}$ and X) therefore lie in the null space of a linear operator (given from H and A). Existence of a null space is guaranteed whenever M+T·K>M·K. Simple manipulation yields T>M·(K=1)/K. Further, W is easily shown to be invertible for all H, except for a set of measure 0, whenever A is full rank and has at least one non-zero element in each row. Thus, the WAX factorization may be applied to any channel matrix H that may be determined between K communication devices 1 and M antennas in the antenna array 10 in FIG. 2.

The underlying rationale for implementing the WAX factorization in the context of the MIMO system in FIG. 2 may be understood by considering that Y=HS+N in accordance with the discussion in relation to FIG. 1A. For simplicity, the contribution from noise (N) is omitted in the following but is trivial for the skilled person to incorporate in the calculations. By forming $\hat{Y}=A^H W^H Y=A^H W^H HS=ES$, with $A^H$ being the Hermitian transpose (also known as "conjugate transpose") of A, and $W^H$ being the Hermitian transpose of W, the receive vector Y of size M×1 is converted into an intermediate vector $\hat{Y}$ of size T×1, which is a linear function of the transmit vector S. Thus, with knowledge of the matrix E, which is a "composite transfer matrix" and corresponds to the matrix multiplication $A^H W^H H$, it is possible to compute the reconstruct vector $\hat{S}$. This may be understood by considering that if the computer device 20 would compute $X^H \hat{Y}$, the overall effect of the preprocessing arrangement 22 and the computer device 20 would be a multiplication of Y with $H^H$, i.e., a matched filter which is lossless. Since H may be measured in conventional manner, A is a "filter matrix" that is predefined in accordance with the WAX factorization, and W is a "scaling matrix" that may be computed by performing the WAX factorization on A and H, the composite transfer matrix E may be computed whenever H has been measured or estimated, for example during a pilot phase. Alternatively, as will be described further below, the composite transfer matrix E may be measured during such a pilot phase. The matrix X ("factorization matrix") is a bi-product of the WAX factorization and may or may not be used for computing the reconstruct vector $\hat{S}$.

In one embodiment, the preprocessing arrangement 22 implements the matrix multiplication $A^H W^H Y$ to generate $\hat{Y} = [\hat{y}_1 \ldots \hat{y}_T]^T$, i.e. the intermediate signals $\hat{y}_1, \ldots, \hat{y}_T$ as shown in FIG. 2.

In one embodiment, the preprocessing arrangement 22 is configured to implement the matrix multiplication $A^H W^H Y$ by hardware components. Since the matrix multiplication $A^H W^H Y$ only involves linear operations, such a hardware implementation may be accomplished by the use of conventional hardware elements that implement simple arithmetic operations such as addition and multiplication. As used herein, "addition" is intended to also include subtraction.

Given that W is a diagonal matrix, it may be noted that the matrix multiplication $W^H Y$ corresponds to a multiplication of a respective diagonal element in the diagonal matrix W with a respective signal value in the receive vector Y:

$$W^H Y = \begin{bmatrix} w_1^* & \cdots & 0 \\ \vdots & \ddots & \vdots \\ 0 & \cdots & w_M^* \end{bmatrix} \cdot \begin{bmatrix} y_1 \\ \vdots \\ y_M \end{bmatrix} = \begin{bmatrix} w_1^* \cdot y_1 \\ \vdots \\ w_M^* \cdot y_M \end{bmatrix}$$

Thus, in the preprocessing arrangement 22 of FIG. 2, the matrix multiplication $W^H Y$ is implemented by multiplication devices or multipliers 24, which are connected to the respective antenna to multiply the respective receive signal $y_j$ with an associated multiplicator value or scale factor $w^*_j$.

Given that the filter matrix A is predefined, its transpose $A^H$ is known and may be implemented in hardware by use of a plurality of adders, and optionally multipliers, that are connected to the outputs of multipliers 24 to specifically combine, in accordance with $A^H$, the receive signals $y_1, \ldots, y_M$ scaled by the respective scale factor $w^*_1, \ldots w^*_M$. In the preprocessing arrangement 22 of FIG. 2, a combination structure 23 implements the transpose filter matrix $A^H$ and thus performs the combination of signals represented by $A^H$. The combination structure 23 may comprise a network of adders 25 (one shown), and optionally multipliers (not shown), which is configured to output the intermediate signals $\hat{y}_1, \ldots, \hat{y}_T$.

If implemented in hardware, the preprocessing arrangement 23 will be configured for a maximum number K of communication devices 1, recalling that the number T of ports on the computer device 20 needs to fulfil T>M·(K−1)/K. For example, K=2 requires T to exceed 0.5 M, and K=4 requires T to exceed 0.75 M.

Figure 3:
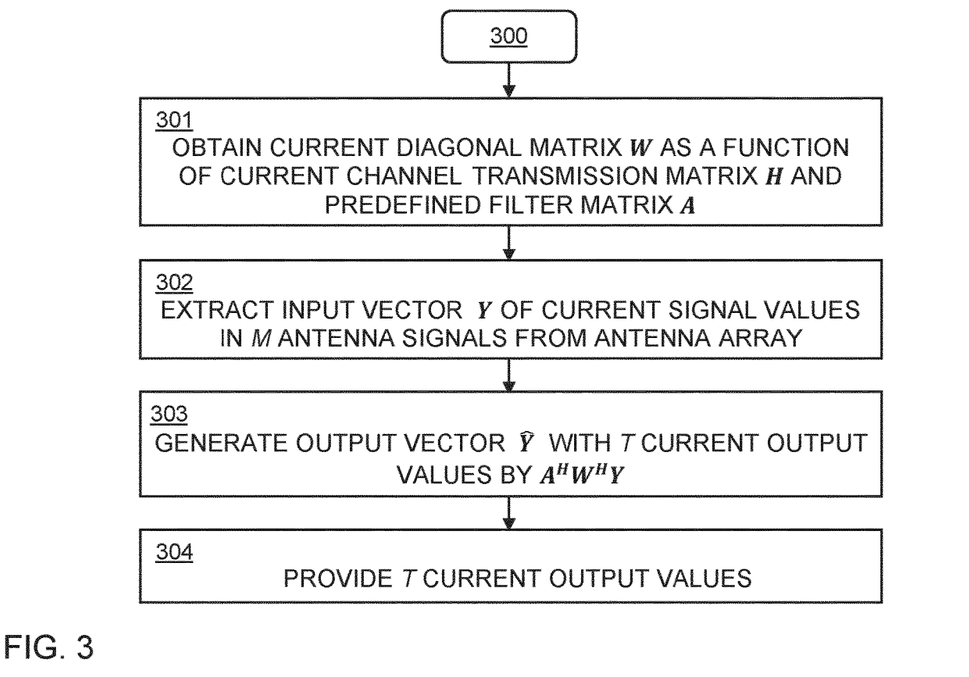
FIG. 3 is a flow chart of a method performed in the system of FIG. 2 in a data phase.

FIG. 3 is a flow chart of a preprocessing method 300 performed and implemented by a preprocessing arrangement 22 in accordance with an embodiment. The method 300 may be repeated at consecutive time points, and the term "current" is used in the following to denote any such time point. Step 301 obtains a current diagonal matrix W ("scaling matrix") and applies the diagonal values of $W^H$ as scale factors for the multipliers 24 in a predefined order. In one embodiment of step 301, the preprocessing arrangement 22 receives the scaling matrix W from another device, such as the computer device 20, which has computed the scaling matrix W as a function of the current transmission matrix H and the predefined filter matrix A, by use of the abovementioned WAX factorization. In another embodiment of step 301, the preprocessing arrangement 22 computes the scaling matrix W. The principles for computation of the scaling matrix W are straight-forward and readily understood from the foregoing definition of the WAX factorization and will not be further detailed herein. Step 302 extracts the receive vector Y ("input vector" of the preprocessing arrangement 22) containing current signal values of a number of M receive signals $y_1, \ldots, y_M$ ("antenna signals") from the antenna array 10. Step 303 generates the intermediate vector $\hat{Y}$ by performing the matrix multiplication $A^H W^H Y$, in hardware and/or software, resulting in a number T of intermediate signals $\hat{y}_1, \ldots, \hat{y}_T$ ("output signals" of the preprocessing arrangement 22). Step 304 provides the intermediate signals $\hat{y}_1, \ldots, \hat{y}_T$ for further processing, for example by the computer device 20.

Figure 4:
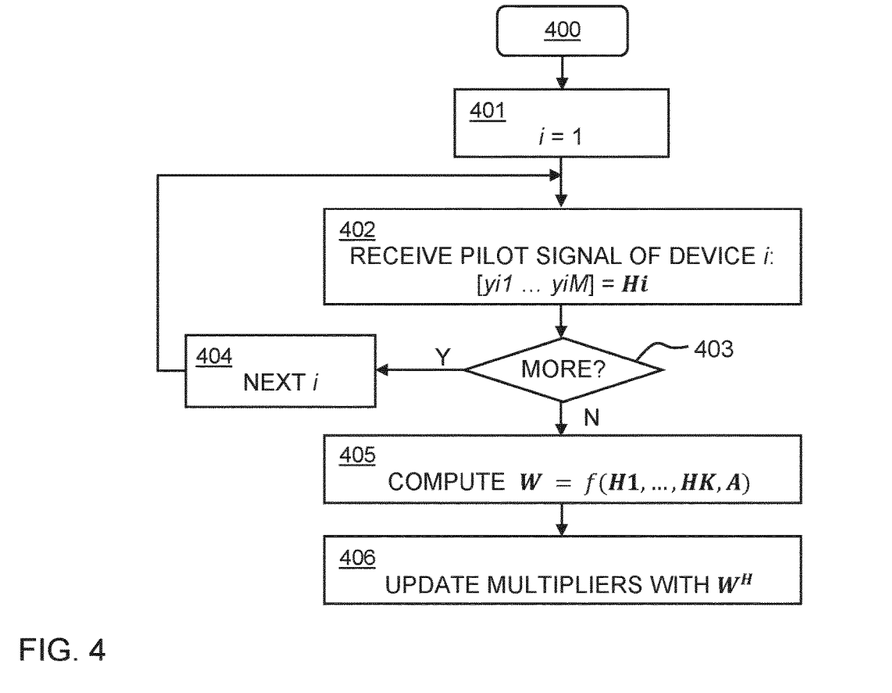
FIG. 4 is a flow chart of a method performed in the system of FIG. 2 in a pilot phase.

FIG. 4 is a flow chart of a method 400 performed by a MIMO system for determining and setting current scale factors of the multipliers 24 in the preprocessing arrangement 22. The method 400 is performed during a conventional pilot phase, also known as training phase, in which the communication devices 1 may be automatically and sequentially activated to transmit predefined pilot signals for receipt by the MIMO system. In the method 400, the pilot signals are sequentially transmitted in accordance with steps 401-404, with the antenna array 10 of the MIMO system receiving the pilot signal from the respective communication device 1 in step 402. The receive signals $y_{i1}, \ldots, y_{iM}$ for the pilot signal from the respective communication device i is equal to or may be converted into a column vector Hi of the channel matrix H, in conventional manner. After completion of steps 401-404 for all communication devices, the MIMO system has acquired one column vector of the channel matrix H for each communication device 1, for example resulting in H1, ..., HK if pilot signals are received from K communication devices. In step 405, the WAX factorization is applied to compute the scaling matrix W as a function of the column vectors H1, ..., HK (corresponding to the channel matrix H) and the predefined filter matrix A. In step 406, the scale factors of the multipliers 24 are updated in correspondence with the diagonal values of $W^H$.

Figure 5:
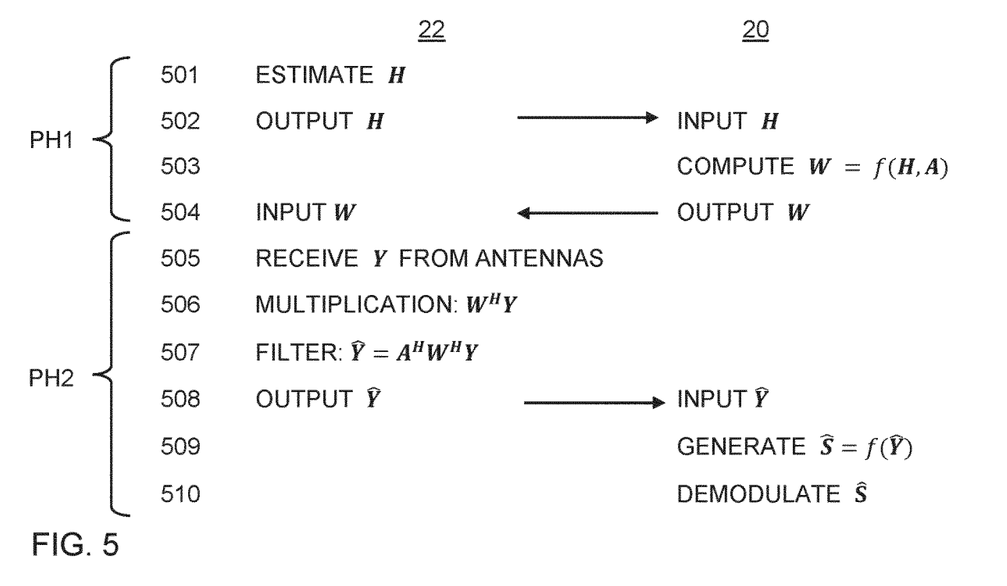
FIG. 5 is a sequence diagram of steps performed by a preprocessing arrangement and a computer device in the system of FIG. 2.

FIG. 5 is a sequence diagram illustrating an example partitioning of processing between the preprocessing arrangement 22 and the computer device 20. Steps 501-504 are performed during the pilot phase PH1, and steps 505-510 are performed during a data phase PH2, in which communication devices 1 may be operated to generate transmit signals $s_1, \ldots, s_K$ that include payload data. In step 502, the processing arrangement 22 estimates a current channel matrix H (cf. steps 401-404). In step 502, the processing arrangement 22 outputs H to the computer device 20, which thereby receives H. In step 503, the computer device 20 computes the scaling matrix W as a function of A and H (cf. step 405). In step 504, the computer device 20 outputs W (or $W^H$) to the processing arrangement 22 to configure the multipliers 24 (cf. steps 301 and 406). In step 505, during the data phase PH2, the processing arrangement 20 receives the receive vector Y from the antenna arrays 10 (cf. step 302). In step 506, the processing arrangement 20 operates to implement the matrix multiplication $W^H Y$. In step 507, the processing arrangement operates to apply $A^H$ to $W^H Y$ so as to generate the intermediate vector $\hat{Y} = A^H W^H Y$. Steps 506-507 may correspond to step 303 in FIG. 3. In step 508, the processing arrangement 20 outputs $\hat{Y}$ to the computer device 20 (cf. step 304), which thereby receives $\hat{Y}$. In step 509, the computer device 20 generates the reconstruct vector $\hat{S}$ as a function of $\hat{Y}$. Examples of the processing in step 509 will be given further below with reference to FIGS. 6A-6C. In step 510, the computer device 20 may process the reconstruct vector $\hat{S}$ for demodulation, in correspondence with conventional practice, and/or for other purposes.

In the example of FIG. 5, the scaling matrix W is computed by the computer device 20, which requires H and W (or $W^H$) to be transmitted between the computer device 20 and the processing arrangement 22. To obviate such transfer, it conceivable to configure the processing arrangement 22 to autonomously compute W and update the scale factors based on W. For example, this may be achieved by daisy chaining the antennas and including a dedicated processing structure (not shown) in the respective antenna, so that the respective antenna is operable to determine its elements of H during the pilot phase, operate the processing structure on these elements and convey the output of the processing structure to be arithmetically combined with the output of the processing structure in the next antenna, etc. Other techniques for distributed processing across antennas may alternatively be employed to perform the WAX factorization without involving the computer device 20.

Figure 6A:
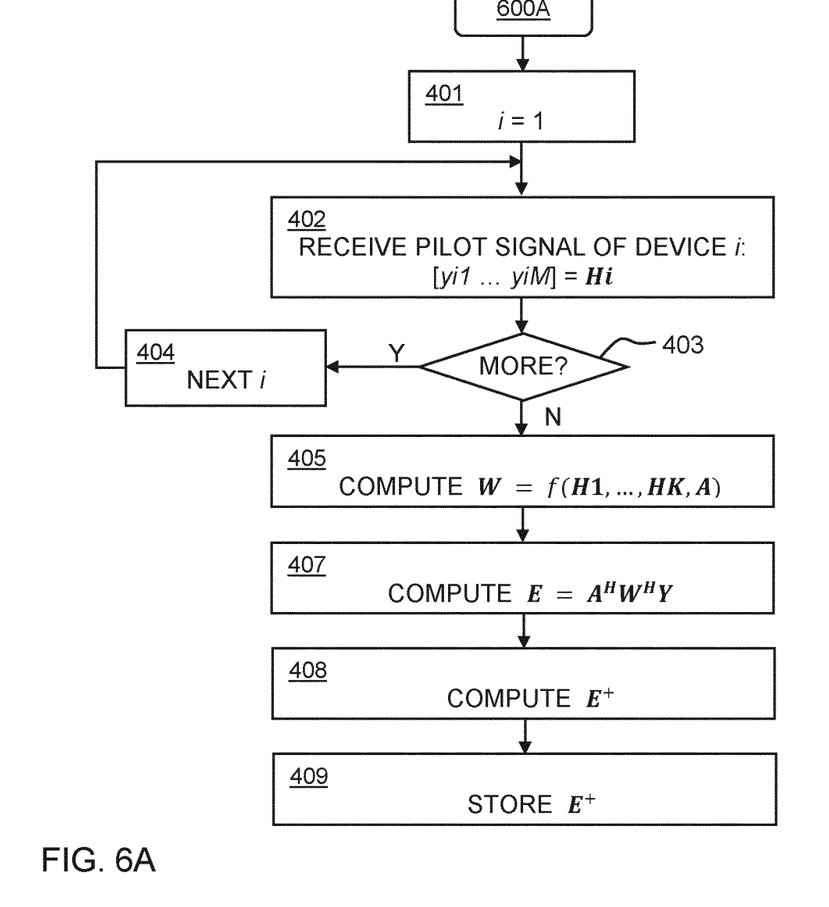
FIG. 6A is a flow chart of a method performed by a computer device in a pilot phase.

FIG. 6A is a flow chart of a method 600A which may be performed by the computer device 20 if configured to compute the scaling matrix W, for example as exemplified in FIG. 5. In FIG. 6A, steps 401-405 are identical to the corresponding steps of FIG. 4 and are performed by the computing device 20 to compute the scaling matrix W. Although not shown, the method 600A may but need not also include step 406. The method 600A further comprises a step 407 of computing the above-mentioned composite transfer matrix E by performing an operation equivalent to the matrix multiplication $A^H W^H H$. As understood from FIG. 6A, the computer device 20 has access to both the current H (by steps 401-404) and the current W (by step 405) and the filter matrix A is predefined and thus also known to the computer device 20. In step 408, the pseudoinverse of the composite transfer matrix E is computed, by any conventional algorithm, resulting in $E^+$. In step 409, the computer device stores $E^+$ in memory for subsequent retrieval during the data phase. In an alternative, steps 401-404 are omitted, if the computer device 20 receives H from the processing arrangement 22. In a further alternative, step 405 is also omitted, if the computer device 20 also receives W from the processing arrangement 22.

Figure 6B:
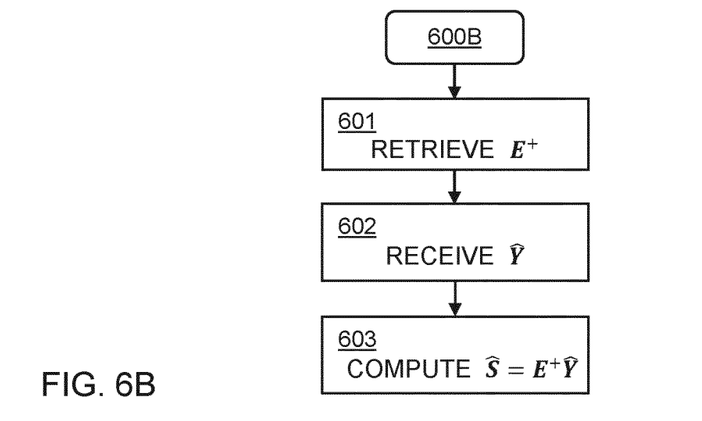
FIG. 6B is a flow chart of a method performed by the computer device in a data phase.

FIG. 6B is a flow chart of a method 600B which may be performed by the computer device 20 during the data phase (cf. steps 508-509). In step 601, the pseudoinverse matrix $E^+$ computed in step 409 is retrieved from memory. In step 602, a current intermediate vector $\hat{Y}$ is received from the processing arrangement 22. In step 603, the reconstruct vector $\hat{S}$ is computed by performing an operation equivalent to the matrix multiplication $E^+ \hat{Y}$.

Figure 6C:
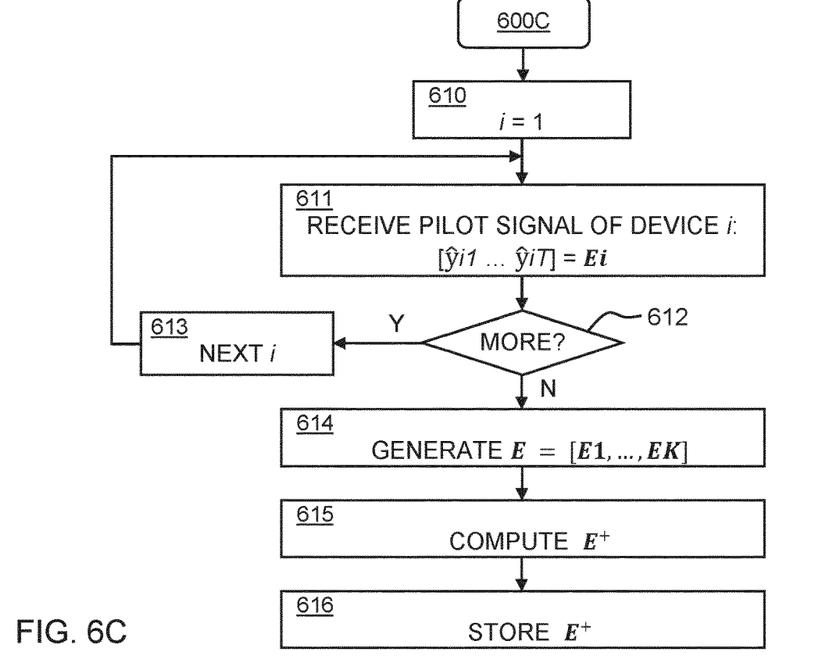
FIG. 6C is a flow chart of an alternative method performed by the computer device in the pilot phase.

FIG. 6C is a flow chart of a method 600C which may be performed by the computer device 20 as an alternative to method 600A. The method 600C does not require the computer device 20 to have access to the channel matrix H or the scaling matrix W. Instead, the method 600C comprises steps 610-613, which are performed during the pilot phase. In the method 600C, intermediate vectors $\hat{Y}$ that are generated by the processing arrangement 20 for the pilot signals are received by the computer device 20. The intermediate signals $\hat{y}_{i1}, \ldots, \hat{y}_{iT}$ generated by the processing arrangement 22 for the pilot signal from the respective communication device i are equal to or may be converted into a column vector Ei of the composite transfer matrix E, by analogy with step 402 in FIG. 4. After completion of steps 610-613 for all communication devices, the MIMO system has acquired one column vector of the composite transfer matrix E for each communication device, for example resulting in E1, ..., EK if pilot signals are received from K communication devices. In step 614, the column vectors E1, ..., EK are fused to form the composite transfer matrix E. In step 615, the pseudoinverse of the composite transfer matrix E is computed, by any conventional algorithm, resulting in $E^+$. In step 616, the computer device 20 stores $E^+$ in memory for subsequent retrieval during the data phase, for example as exemplified by method 600B.

The foregoing methods of processing in the computer device 20 are non-limiting examples of efficient ways of computing the reconstruct vector $\hat{S}$. It is also conceivable to use the matrix X, which may be generated as part of the WAX factorization and known to the computer device 20, for computing the reconstruct vector $\hat{S}$. In one embodiment, the computer device 20 may first perform the matrix multiplication $X^H \hat{Y}$, which is equal to $H^H Y$, compute $(H^H H)^{-1}$, and then perform the matrix multiplication $(H^H H)^{-1} X^H \hat{Y}$ to generate the reconstruct vector $\hat{S}$. In other embodiments, the computer device 20 does not compute the reconstruct vector $\hat{S}$ but processes the intermediate vector $\hat{Y}$ in any other way to enable subsequent data extraction.

It should be noted that there are a large number of filter matrices A that may be used in the WAX factorization. As understood from the foregoing, the filter matrix A may be predefined to comprise at least one value different from zero in each row and to be of full rank. Further, all rows in the filter matrix A may be different. In one embodiment, the filter matrix A is defined to be sparse, or even as sparse as possible. Each element with a non-zero value in the filter matrix A corresponds to an addition, and possibly a multiplication. Thus, the sparser the filter matrix A, the less arithmetic operations need to be performed, resulting in a more efficient and less complex processing arrangement 22. In a hardware implementation, each non-zero element in A (or $A^H$) is represented by an adder 25 in the combination structure 23 (cf. FIG. 2), and possibly a multiplier. In one embodiment, all non-zero elements of the filter matrix A is set to 1. This will obviate the need for multiplications when applying the filter matrix A. In a hardware implementation, this means that the combination structure 23 is free of multipliers.

Figure 7:
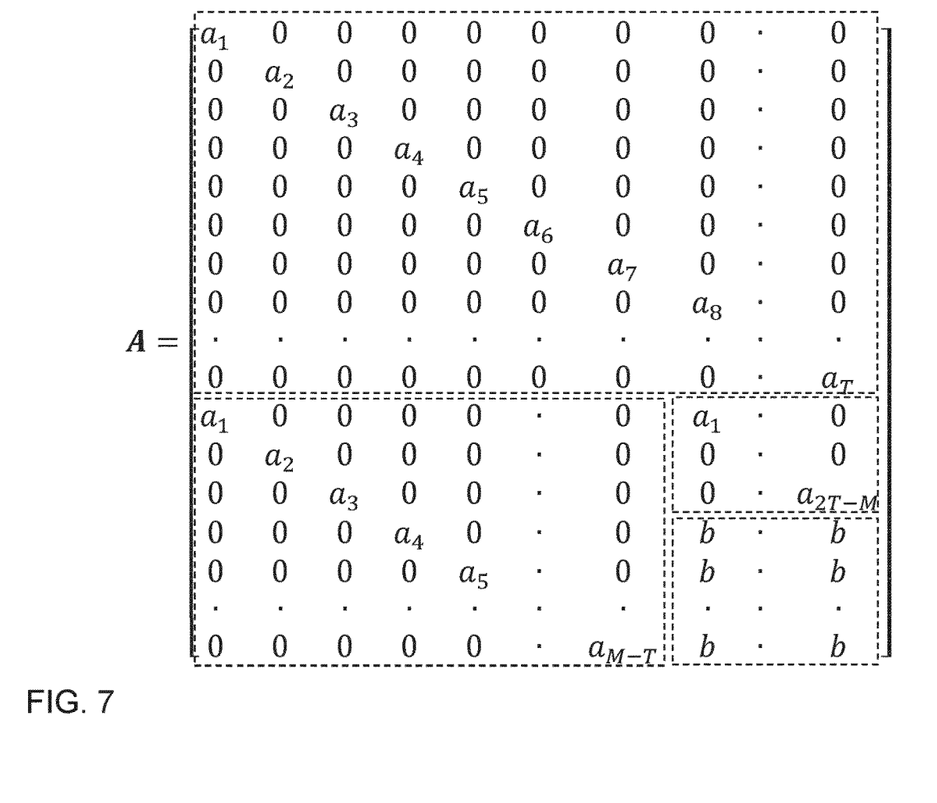
FIG. 7 shows an example of a predefined filter matrix represented by a combination structure in the system of FIG. 2.

An example of a filter matrix A is shown in FIG. 7. The illustrated matrix A has M rows and T columns and is sparse. The sparseness is achieved by merging diagonal sub-matrices (delimited by dashed boxes): a T×T diagonal sub-matrix in the upper portion of A, a (M−T)×(M−T) diagonal sub-matrix to the left below the upper portion, and a (2T−M)×(2T−M) diagonal sub-matrix to the right below the upper portion. The lower right corner of A is padded by a (2M−3T)×(M−T) sub-matrix of elements. The elements of the latter padding sub-matrix may be identical, as shown (value b), or have other values, for example by forming a stack of diagonal sub-matrixes. The elements designated by $a_1$, $a_2$, etc. and b in FIG. 7 may have any non-zero value. In one embodiment, all non-zero values are set to 1. The matrix A in FIG. 7 is merely given as an example and many alternatives are readily available to the skilled person based on the present disclosure.

The embodiments described in the foregoing are applicable irrespective of communication technology and may for example be implemented in any multi-antenna communication system configured in accordance with any standardized or proprietary wireless communication protocol, including but not limited to 3GPP, WiMAX and IEEE802.11 standards.

The embodiments described herein may be implemented in any wireless communication device, apparatus, node or system having an antenna array with multiple antennas, for example a base station or an access point. It is also conceivable to implement the embodiments in various types of MIMO-enabled user equipment for wireless communication, such as a mobile phone, a PDA, a laptop, a wearable computer, a wireless sensor, etc.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, items are recited to summarize some aspects and embodiments as disclosed in the foregoing.

Item 1: A preprocessing arrangement for a multiple-antenna communication system, the preprocessing arrangement comprising a first plurality of inputs for antenna signals from an antenna array (10) and a second plurality of outputs for connection to at least one computer device (20), wherein the second plurality is less than the first plurality, the preprocessing arrangement being configured to:
 obtain a diagonal matrix, W, of multiplicator values, wherein the diagonal matrix W is given by a relation H=WAX, wherein H is a channel transmission matrix for the multiple-antenna communication system, A is a predefined filter matrix, and X is a matrix that depends on the channel transmission matrix H;
 extract an input vector Y of signal values in the antenna signals from the antenna array (10);
 generate an output vector $\hat{Y}$ of output values by forming $A^H W^H Y$, wherein $A^H$ is a Hermitian transpose matrix of the predefined filter matrix A and $W^H$ is a Hermitian transpose of the diagonal matrix W; and
 provide the output values in the output vector $\hat{Y}$ on a respective output among the second plurality of outputs.

Item 2: The preprocessing arrangement of item 1, which is implemented by hardware components (23, 24).

Item 3: The preprocessing arrangement of item 1 or 2, which comprises multipliers (24) connected to the first plurality of inputs and operable to multiply the signal values by a respective multiplicator value of the Hermitian transpose of the diagonal matrix $W^H$.

Item 4: The preprocessing arrangement of item 3, which comprises a combination structure (23) implementing the transpose matrix $A^H$, the combination structure (23) being connected to the multipliers (24) and operating on product values produced by the multipliers (24) to generate the output values.

Item 5: The preprocessing arrangement of item 4, wherein a respective element with non-zero value in the transpose matrix $A^H$ is represented by at least an adder (25) in the combination structure (23).

Item 6: The preprocessing arrangement of any preceding item, wherein the predefined filter matrix A comprises at least one value different from zero in each row and is full rank, and wherein all rows in the predefined filter matrix A are different.

Item 7: The preprocessing arrangement of any preceding item, wherein the predefined filter matrix A comprises only 0 and 1.

Item 8: The preprocessing arrangement of any preceding item, wherein the predefined filter matrix A is sparse.

Item 9: The preprocessing arrangement of any preceding item, wherein the first plurality of inputs comprises M inputs, the second plurality of outputs comprises T outputs, and K is a maximum number of individual devices that are allowed to simultaneously communicate with the multiple-antenna communication system, and wherein preprocessing arrangement is configured so that $T<M\cdot(K-1)/K$.

Item 10: The preprocessing arrangement of item 9, wherein the channel transmission matrix H has size M×K, the diagonal matrix W has size M×M, the predefined filter matrix A has size M×T, the matrix X has size T×K, the input vector Y has size M×1, and the output vector V has size T×1.

Item 11: A receiver system comprising the preprocessing arrangement (22) of any preceding item and at least one computer device (20) coupled to receive the output values on the second plurality of outputs of the preprocessing arrangement (22).

Item 12: The receiver system of item 11, which is configured to generate elements of the channel transmission matrix H during a training phase when a sequence of pilot signals are received by the antenna array (10), and generate the diagonal matrix W as a function of the channel transmission matrix H and the predefined filter matrix A.

Item 13: The receiver system of item 11 or 12, wherein the at least one computer device (20) is configured to obtain a transformation matrix E representative of $A^H W^H H$, generate a pseudoinverse of the transformation matrix E, and operate the pseudoinverse on the output vector $\hat{Y}$.

Item 14: The receiver system of item 13, wherein the at least one computer device (20) is configured to obtain the transpose matrix $A^H$, the diagonal matrix W and the channel transmission matrix H, and compute the transformation matrix E as $A^H W^H H$.

Item 15: The receiver system of item 11 or 12, wherein the at least one computer device (20) is configured to generate the transformation matrix E based on a first output vector $\hat{Y}$ provided by the processing arrangement (22) during a training phase when a sequence of pilot signals are received by the antenna array (10), generate a pseudoinverse of the transformation matrix E, and operate the pseudoinverse on a second output vector $\hat{Y}$ provided by the processing arrangement (22) subsequent to the training phase.

Item 16: A method of preprocessing in a multiple-antenna communication system, said method comprising:
 obtaining (301) a diagonal matrix, W, of multiplicator values, wherein the diagonal matrix W is given by a relation H=WAX, wherein H is a channel transmission matrix for the multiple-antenna communication system, A is a predefined filter matrix, and X is a matrix that depends on the channel transmission matrix H;

extracting (302) an input vector Y of a first plurality of signal values in antenna signals from an antenna array in the multiple-antenna communication system;

generating (303) an output vector $\hat{Y}$ of a second plurality of output values by forming $A^H W^H Y$, wherein $A^H$ is a Hermitian transpose matrix of the predefined matrix A and $W^H$ is a Hermitian transpose of the diagonal matrix W, and wherein the second plurality is less than the first plurality; and providing (304) the output values in the output vector $\hat{Y}$ to at least one computer device in the multiple-antenna communication system.

The invention claimed is:

1. A preprocessing arrangement for a multiple-antenna communication system, the preprocessing arrangement comprising a first plurality of inputs for antenna signals from an antenna array and a second plurality of outputs for connection to at least one computer device, wherein the second plurality is less than the first plurality, the preprocessing arrangement being configured to:

obtain a diagonal matrix (W) of multiplicator values, wherein the diagonal matrix W is given by a relation H=WAX, wherein H is a channel transmission matrix for the multiple-antenna communication system, A is a predefined filter matrix, and X is a matrix that depends on the channel transmission matrix H;

extract an input vector Y of signal values in the antenna signals from the antenna array;

generate an output vector $\hat{Y}$ of output values by forming $A^H W^H Y$, wherein $A^H$ is a Hermitian transpose matrix of the predefined filter matrix A and $W^H$ is a Hermitian transpose of the diagonal matrix W; and provide the output values in the output vector $\hat{Y}$ on a respective output among the second plurality of outputs.

2. The preprocessing arrangement of claim 1, wherein the preprocessing arrangement is implemented by hardware components.

3. The preprocessing arrangement of claim 1, comprising multipliers connected to the first plurality of inputs and operable to multiply the signal values by a respective multiplicator value of the Hermitian transpose of the diagonal matrix $W^H$.

4. The preprocessing arrangement of claim 3, comprising a combination structure implementing the transpose matrix $A^H$, the combination structure being connected to the multipliers and operating on product values produced by the multipliers to generate the output values.

5. The preprocessing arrangement of claim 4, wherein a respective element with non-zero value in the transpose matrix $A^H$ is represented by at least an adder in the combination structure.

6. The preprocessing arrangement of claim 1, wherein the predefined filter matrix A comprises at least one value different from zero in each row and is full rank, and wherein all rows in the predefined filter matrix A are different.

7. The preprocessing arrangement of claim 1, wherein the predefined filter matrix A comprises only 0 and 1.

8. The preprocessing arrangement of claim 1, wherein the predefined filter matrix A is sparse.

9. The preprocessing arrangement of claim 1, wherein the first plurality of inputs comprises M inputs, the second plurality of outputs comprises T outputs, and K is a maximum number of individual devices that are allowed to simultaneously communicate with the multiple-antenna communication system, and wherein preprocessing arrangement is configured so that T<M·(K−1)/K.

10. The preprocessing arrangement of claim 9, wherein the channel transmission matrix H has size M×K, the diagonal matrix W has size M×M, the predefined filter matrix A has size M×T, the matrix X has size T×K, the input vector Y has size M×1, and the output vector $\hat{Y}$ has size T×1.

11. A receiver system comprising the preprocessing arrangement of claim 1 and at least one computer device coupled to receive the output values on the second plurality of outputs of the preprocessing arrangement.

12. The receiver system of claim 11, wherein the receiver system is configured to generate elements of the channel transmission matrix H during a training phase when a sequence of pilot signals are received by the antenna array, and generate the diagonal matrix W as a function of the channel transmission matrix H and the predefined filter matrix A.

13. The receiver system of claim 11, wherein the at least one computer device is configured to obtain a transformation matrix E representative of $A^H W^H H$, generate a pseudoinverse of the transformation matrix E, and operate the pseudoinverse on the output vector $\hat{Y}$.

14. The receiver system of claim 13, wherein the at least one computer device is configured to obtain the transpose matrix $A^H$, the diagonal matrix W and the channel transmission matrix H, and compute the transformation matrix E as $A^H W^H H$.

15. The receiver system of claim 11, wherein the at least one computer device is configured to generate the transformation matrix E based on a first output vector $\hat{Y}$ provided by the processing arrangement during a training phase when a sequence of pilot signals are received by the antenna array, generate a pseudoinverse of the transformation matrix E, and operate the pseudoinverse on a second output vector $\hat{Y}$ provided by the processing arrangement subsequent to the training phase.

16. A method of preprocessing in a multiple-antenna communication system, said method comprising:

obtaining a diagonal matrix (W) of multiplicator values, wherein the diagonal matrix W is given by a relation H=WAX, wherein H is a channel transmission matrix for the multiple-antenna communication system, A is a predefined filter matrix, and X is a matrix that depends on the channel transmission matrix H;

extracting an input vector Y of a first plurality of signal values in antenna signals from an antenna array in the multiple-antenna communication system;

generating an output vector $\hat{Y}$ of a second plurality of output values by forming $A^H W^H Y$, wherein $A^H$ is a Hermitian transpose matrix of the predefined matrix A and $W^H$ is a Hermitian transpose of the diagonal matrix W, and wherein the second plurality is less than the first plurality; and providing the output values in the output vector $\hat{Y}$ to at least one computer device in the multiple-antenna communication system.

17. The method of claim 16, wherein the predefined filter matrix A comprises at least one value different from zero in each row and is full rank, and wherein all rows in the predefined filter matrix A are different.

18. The method of claim 16, wherein the predefined filter matrix A comprises only 0 and 1.

19. The method of claim 16, wherein the predefined filter matrix A is sparse.

20. The method of claim 16, wherein the first plurality of signal values comprises M signal values, the second plurality of output values comprises T output values, and K is a maximum number of individual devices that are allowed to simultaneously communicate with the multiple-antenna communication system, and wherein the channel transmission matrix H has size M×K, the diagonal matrix W has size M×M, the predefined filter matrix A has size M×T, the matrix X has size T×K, the input vector Y has size M×1, and the output vector $\hat{Y}$ has size T×1.

* * * * *